United States Patent
Sidhartha et al.

(10) Patent No.: US 11,212,168 B2
(45) Date of Patent: Dec. 28, 2021

(54) APPARATUSES AND METHODS FOR REMOTE COMPUTING NODE INITIALIZATION USING A CONFIGURATION TEMPLATE AND RESOURCE POOLS

(71) Applicant: Nutanix, Inc., San Jose, CA (US)

(72) Inventors: Kumar Sidhartha, Bangalore (IN); Monica Adusumilli, Vijayawada (IN); Toms Varghese, Thiruvalla (IN)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 16/689,870

(22) Filed: Nov. 20, 2019

(65) Prior Publication Data
US 2021/0152420 A1    May 20, 2021

(51) Int. Cl.
| | |
|---|---|
| *H04L 29/08* | (2006.01) |
| *G06F 17/30* | (2006.01) |
| *G06F 11/34* | (2006.01) |
| *G06F 11/30* | (2006.01) |
| *H04L 12/24* | (2006.01) |
| *H04L 29/06* | (2006.01) |
| *H04L 29/12* | (2006.01) |

(52) U.S. Cl.
CPC ...... *H04L 41/0806* (2013.01); *H04L 61/2007* (2013.01); *H04L 61/2061* (2013.01); *H04L 63/08* (2013.01)

(58) Field of Classification Search
CPC . H04L 41/0806; H04L 63/08; H04L 61/2007; H04L 61/2061

USPC .......................................................... 709/222
See application file for complete search history.

(56) References Cited

U.S. PATENT DOCUMENTS

| | | | |
|---|---|---|---|
| 7,920,549 B2 | 4/2011 | Alt et al. | |
| 8,429,276 B1 | 4/2013 | Kumar et al. | |
| 8,549,518 B1 | 10/2013 | Aron et al. | |
| 8,601,473 B1 | 12/2013 | Aron et al. | |
| 8,656,018 B1* | 2/2014 | Keagy ................... | G06F 9/4555 709/226 |
| 8,726,274 B2* | 5/2014 | Pafumi ............... | G06F 9/45558 718/1 |

(Continued)

OTHER PUBLICATIONS

Cano, Ignacio et al. "Curator: Self-Managing Storage for Enterprise Clusters"; University of Washington; published Mar. 2017; pp. all.

(Continued)

*Primary Examiner* — Moustafa M Meky
*Assistant Examiner* — Elizabeth Kassa
(74) *Attorney, Agent, or Firm* — Dorsey & Whitney LLP

(57) ABSTRACT

A configuration management system is configured to receive a registration request message from a computing node that includes identifying information, and to select a node pool in response to detection of a match between the identifying information matching a qualification parameter assigned to the node pool. The configuration management system is further configured to select configuration information for the computing node based on an image configuration template associated with the node pool. At least part of the configuration information is selected from a predefined resource pool. The configuration management system is further configured to provide the configuration information to the computing node.

32 Claims, 6 Drawing Sheets

(56) References Cited

U.S. PATENT DOCUMENTS

| | | | |
|---|---|---|---|
| 8,776,050 | B2 | 7/2014 | Plouffe et al. |
| 8,850,130 | B1 | 9/2014 | Aron et al. |
| 8,863,124 | B1 | 10/2014 | Aron |
| 8,938,523 | B2 | 1/2015 | Jaroker |
| 9,009,106 | B1 | 4/2015 | Aron et al. |
| 9,027,087 | B2 | 5/2015 | Ishaya et al. |
| 9,069,708 | B2 | 6/2015 | Gill et al. |
| 9,135,145 | B2 | 9/2015 | Voccio et al. |
| 9,152,447 | B2 | 10/2015 | Venkat et al. |
| 9,336,132 | B1 | 5/2016 | Aron et al. |
| 9,426,026 | B2 | 8/2016 | Rider |
| 9,426,030 | B1 | 8/2016 | Anerousis et al. |
| 9,652,265 | B1 | 5/2017 | Narayanasamy et al. |
| 9,716,624 | B2 | 7/2017 | Zeyliger et al. |
| 9,747,287 | B1 | 8/2017 | Bhardwaj et al. |
| 9,772,866 | B1 | 9/2017 | Aron et al. |
| 10,191,757 | B2 | 1/2019 | Venkataramaiah et al. |
| 10,284,642 | B2 | 5/2019 | Shanley et al. |
| 10,979,289 | B2 | 4/2021 | Sidhartha et al. |
| 2005/0120160 | A1 | 6/2005 | Plouffe et al. |
| 2005/0169195 | A1 | 8/2005 | Luo et al. |
| 2006/0143432 | A1 | 6/2006 | Rothman et al. |
| 2006/0155674 | A1 | 7/2006 | Traut et al. |
| 2010/0017597 | A1 | 1/2010 | Chandwani |
| 2011/0075591 | A1 | 3/2011 | Cheshire |
| 2012/0150985 | A1* | 6/2012 | Marion ............... G06F 11/0712 709/207 |
| 2012/0207291 | A1 | 8/2012 | West et al. |
| 2013/0227144 | A1* | 8/2013 | Saito .................. G06F 9/5072 709/226 |
| 2013/0287026 | A1 | 10/2013 | Davie |
| 2014/0156824 | A1 | 6/2014 | Biswas et al. |
| 2015/0096011 | A1 | 4/2015 | Watt |
| 2015/0134791 | A1 | 5/2015 | Cohn et al. |
| 2015/0271014 | A1 | 9/2015 | Madama |
| 2015/0341189 | A1 | 11/2015 | Zhang et al. |
| 2015/0363724 | A1 | 12/2015 | Chatterjee et al. |
| 2015/0365323 | A1 | 12/2015 | Duminuco et al. |
| 2016/0006607 | A1 | 1/2016 | Wang et al. |
| 2016/0212044 | A1 | 7/2016 | Danforth |
| 2016/0255045 | A1 | 9/2016 | Kolesnik et al. |
| 2017/0223053 | A1 | 8/2017 | Dhanabalan et al. |
| 2018/0129524 | A1 | 5/2018 | Bryant et al. |
| 2018/0367530 | A1 | 12/2018 | Mistry |
| 2018/0375921 | A1* | 12/2018 | Wang ..................... H04L 67/34 |
| 2019/0166032 | A1* | 5/2019 | Inbaraj .................... H04L 43/16 |
| 2019/0188021 | A1* | 6/2019 | Finn .................... G06F 9/45558 |
| 2020/0044917 | A1 | 2/2020 | Peng |
| 2021/0051062 | A1 | 2/2021 | Sidhartha et al. |

OTHER PUBLICATIONS

U.S. Appl. No. 15/980,321 titled "Apparatuses and Methods for Zero Touch Computing Node Initialization" filed May 15, 2018, pp. all.

U.S. Appl. No. 16/681,628 titled "Apparatuses and Methods for Remote Computing Node Registration and Authentication" filed Nov. 12, 2019, pp. all.

Abhilash, G. B. "VMware vSphere 5.5 Cookbook", Packet Publishing, Limited, Olton Birmingham, Feb. 27, 2015, pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven. "The Nutanix Bible" (Jan. 12, 2016), from https://nutanixbible.com/, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/, pp. all.

Poitras, Steven. "The Nutanix Bible" (Jan. 3, 2017), from https://nutanixbible.com/, pp. all.

Poitras, Steven. "The Nutanix Bible" (Jan. 3, 2018), from https://nutanixbible.com/, pp. all.

Poitras, Steven. "The Nutanix Bible" (Sep. 4, 2015), from https://nutanixbible.com/, pp. all.

Poitras, Steven. "The Nutanix Bible" (Jan. 7, 2015), from http://stevenpoitras.com/the-nutanix-bible/ (Publication date based on indicated capture date by Archive.org; first publication date unknown), pp. all.

Poitras, Steven. "The Nutanix Bible" (Jan. 8, 2019), from https://nutanixbible.com/, pp. all.

Poitras, Steven. "The Nutanix Bible" (Jun. 8, 2017), from https://nutanixbible.com/, pp. all.

Poitras, Steven. "The Nutanix Bible" (Jun. 9, 2015), from http://stevenpoitras.com/the-nutanix-bible/ (Publication date based on indicated capture date by Archive.org; first publication date unknown), pp. all.

Poitras, Steven. "The Nutanix Bible" (Jun. 9, 2016), from https://nutanixbible.com/, pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

"Cisco HyperFlex Edge 4.0 with Cisco Intersight—Deployment Guide for HyperFlex Edge Systems with Cisco Intersight Cloud Management Platform and VMware ESXi", Cisco, Oct. 11. 2019, pp. 68-96.

"Deployment—VMware Validated Design for Remote Office Branch Office 4.3", VMware Validated Design 4.3 VMware; Validated Design for Rernote Office Branch Office 4.3, Sep. 25, 2018, pp. 34-36.

"SmartProvisioning R76 Adminstration Guide", Check Point Software Technologies Ltd, Feb. 7, 2013, pp. 87-97.

* cited by examiner

APPARATUSES AND METHODS FOR REMOTE COMPUTING NODE INITIALIZATION USING A CONFIGURATION TEMPLATE AND RESOURCE POOLS

BACKGROUND

Many businesses maintain small information technology (IT) infrastructure installations in remote sites, like branch offices and retail stores (e.g., remote office, branch office (ROBO) sites). In some instances, businesses may reduce IT costs by maintaining a skilled IT team in one location, and remotely manage ROBO sites using the Internet or other network connectivity. Conventionally, deploying and configuring a complex distributed software application at a ROBO site requires skilled IT staff be physically present. It can be difficult and expensive to hire or temporarily deploy IT staff at ROBO sites.

DETAILED DESCRIPTION

Figure 1:
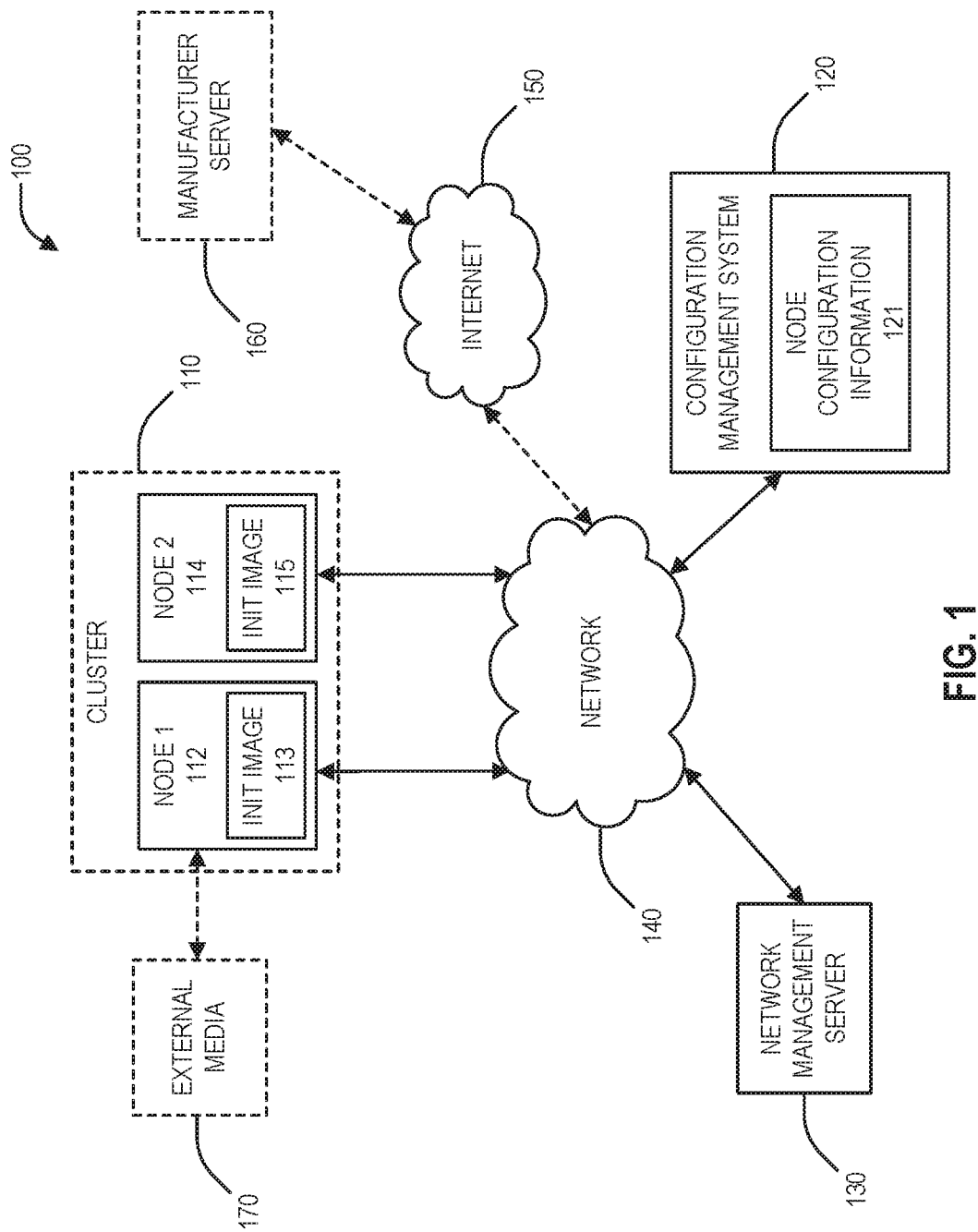
FIG. 1 is a block diagram of a wide area computing system 100, in accordance with an embodiment of the present disclosure.

This disclosure describes creation of node pools for use by a central configuration management system (e.g., including one or more servers) configured to facilitate registration and authentication of computing nodes deployed at remote sites. When a computing node is initially powered on at a remote site, it may call back to a configuration management system to retrieve relevant configuration information, such as authentication information (e.g., encryption keys), software images, firmware, network configuration settings, policies, licenses, support contracts, update procedures, any combination thereof, etc. In some systems, the configuration information may be specifically, manually allocated on a per-node basis by an administrator. This disclosure includes use of an image configuration template and resource pools from which the configuration management system can select configuration information to assign to/provide to a computing node, in some examples. Separate image configuration templates and/or resource pools may be generated for different groups of computing nodes (e.g., node pools). The node pools may be defined by certain qualification parameters, such as a physical location, a model number, a serial number, another identifier, etc. The resource pools may include Internet protocol (IP) address pools for various components of a systems installed on the node, such as an intelligent platform management interface (IPMI) IP address pool, a controller virtual machine (CVM) IP address pool, a Hypervisor IP address pool, or combinations thereof. In some examples, the IP address pools may be location-specific. The image configuration template may refer to one or more of the resource pools, such as the IP address pools, and may specify other imaging configuration requirements (e.g., software versions, hypervisor type, number of nodes in a cluster (if a cluster is required), etc. An image configuration template is bound to the node pools to provide information for configuring certain nodes. When the central management system receives a registration request for a new computing node that includes certain qualification parameters, the central management system may select a particular node pool based on the qualification parameters. The registration request and/or the qualification parameters may be provided using DHCP messages, in some examples. Using the selected node pool, the central management system may use the bound image configuration template to determine and select certain configuration information to provide to the node, such as selecting one or more IP addresses from IP address pools, selecting software images, hypervisor types, policies, licenses, support contracts, update procedures, or any combination thereof to provide to the computing node. The new computing node may use the configuration information to configuration itself for normal operation.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of a wide area computing system 100, in accordance with an embodiment of the present disclosure. The wide area computing system of FIG. 1 includes a computing node cluster 110 connected to a network management server 130 and a configuration management system 120 via a network 140. The computing nodes 112 and/Or 114 may include, for example, a server computer, a laptop computer, a desktop computer, a tablet computer, a smart phone, or any other type of computing device. In some examples, the network 140 may connect to a manufacturer server 160 via the Internet 150. The network 140 may include any type of network capable of routing data transmissions from one network device (e.g., the computing server cluster 110, the configuration management system 120, the network management server 130, and/or the manufacturer server 160) to another. For example, the network 140 may include a local area network (LAN), wide area network (WAN), intranet, or a combination thereof. The network 140 may be a wired network, a wireless network, or a combination thereof.

The computing server cluster 110 may include a computing node 112 and a computing node 114. More than two computing nodes may be included in the computing node cluster 110 without departing from the scope of the disclosure. Each of the computing node 112 and computing node 114 may include an initialization application/service 113 and an initialization application/service 115, respectively. The computing node 112 and the computing node 114 may work together within the computing node cluster 110 to perform a function, such as a distributed file server, a backup system, etc. In some examples, the computing node 112 may be a primary computing node and the computing node 114 may be secondary computing node. The computing node 112 and the computing node 114 may be applied to other use cases, without departing from the scope of the disclosure. Because the computing node 112 and the computing node 114 of the computing node cluster 110 may perform different functions for different installations, each of the computing node 112 and the computing node 114 include software and firmware, support permissions, contracts, assigned policies, and update procedures specific to the application. Further, operation of the computing node 112 and the computing node 114 may rely on a level of compatibility between software builds to facilitate successful communication between the computing node 112 and the computing node 114, and between the computing node cluster 110 and the configuration management system 120.

To initiate loading of the software and firmware, support permissions, contracts, assigned policies, and update procedures specific to the application, the initialization applications/services 113 and/or 115 may initiate a negotiation with the network management server 130 to connect to the network 140. The negotiation may include broadcasting a DHCP discovery message requesting network resources (e.g., an offered IP address, server, gateway, and client IP addresses, lease time, DHCP server IP address, etc.). The broadcast DHCP discovery message may include an identifier specific to the computing node 112 or 114. In response to the DHCP discovery message, the computing node 112 and/or the computing node 114 may receive an offer message that includes selected and/or provided network resources. The computing node 112 or 114 may respond to the offer message with a request for the offered network resources, which may be acknowledged by the network management server. The network management server 130 may respond with an acknowledgment message that includes an assigned IP address, server, gateway, and client IP addresses, lease time, DHCP server IP address, etc.

In some examples, the initialization applications/services 113 and/or 115 may cause the computing nodes 112 and/or 114 to include a vendor class identifier in one or both of the discovery message or the request message. In response to the vendor class identifier, the network management server 130 may further include contact information associated with the configuration management system 120, such as an address and an authentication key (e.g., API encryption key) in one or both of the offer message or the acknowledgment message. The contact information associated with the configuration management system 120 may be encoded in the vendor encapsulated options of the offer and/or the acknowledgement message such that it can be decoded by the initialization applications/services 113 and/or 115.

Using the contact information and the assigned network resources, the initialization applications/services 113 and/or 115 may cause the computing nodes 112 and/or 114, respectively, to contact the configuration management system 120 to register the computing node 112 and/or the computing node 114, respectively with the configuration management system 120, in some examples. Once registered, the initialization applications/services 113 and/or 115 may contact the configuration management system 120 to request computing node configuration information for the computing node 112 and the computing node 114, respectively.

The configuration management system 120 may communicate with the computing node cluster 110 via the network 140. The configuration management system 120 may include one or more computing devices or servers, each including one or more processors and memory, etc. that are configured to store software or instructions that, when executed, cause the configuration management system 120 to perform operations described herein. The configuration management system 120 operates configuration and/or infrastructure management software to manage configuration of the computing server cluster 110. The configuration management system 120 may include node configuration information 121 that provides information for computing nodes 112 and 114 of the computing node cluster 110.

The node configuration information 121 may include image configuration templates, node pools, and resource pools. The resource pools may include Internet protocol (IP) address pools for various components of a systems installed on the node, such as an intelligent platform management interface (IPMI) IP address pool, a controller virtual machine (CVM) IP address pool, a Hypervisor IP address pool, or combinations thereof.

Each of the image configuration templates may refer to one or more of the resource pools, such as the IP address pools, and may specify other imaging configuration requirements (e.g., software versions, hypervisor type, number of nodes in a cluster (if a cluster is required), etc.

The node pools may be defined by certain qualification parameters, such as a physical location, a model number, a serial number, another identifier, etc. At least one image configuration template is bound to the node pools to provide information for configuring qualified nodes.

In response to receipt of a registration request from the computing node 112 or the computing node 114, the configuration management system 120 may identify a node pool that with qualification parameters that matches identifying information received in the registration request, such as a physical location, a model number, a serial number, another identifier, etc. Using the identified node pool, the configuration management system 120 may look up the bound configuration image template to select configuration information for the computing node, including software versions, hypervisor version/type, instructions regarding cluster formation (e.g., including a number of nodes in the cluster), The configuration management system 120 may also access the resource pools linked to the image configuration template to select various configuration parameters, such as one or more IP addresses (e.g., such as an IPMI IP address, a CVM IP address, a Hypervisor IP address, or combinations thereof). The image configuration template may also provide additional information, such as other software versions and images, policies, licenses, support contracts, update procedures, or any combination thereof. The configuration management system may provide the selected configuration information to the requesting computing node 112 or 114 for use in configuring the computing node.

The network management server 130 may be a discrete hardware component or device, or may be distributed in one or more other devices connected to the network 140, such as the configuration management system 120. The network management server 130 may include a DHCP server that uses DHCP to manage network resources (e.g., an offered IP address, server, gateway, and client IP addresses, lease time, DHCP server IP address, etc.) for the network 140, including selecting network resources and logging requests for network resources to provide indications of overlap. As part of the DHCP, the network management server 130 may provide information for connection to the configuration management system 120 via specified fields in DHCP messages. The specified fields may include vendor encapsulated options of the DHCP messages. At least some of the allocated network resources and/or the information for connection to the configuration management server may be sent in response to a vendor class identifier or other identifier included in the broadcast message from the computing node 112 and/or the computing node 114. The connection information provided by the network management server 130 may include at least a host identifier associated with the configuration management server 130 and/or an encryption key (e.g., API encryption key). The computing nodes 112 and 114 may attempt to register with the configuration management system 120 using the host identifier. In some examples, the registration request may be encrypted using the encryption key.

In some examples, initialization of the computing nodes 112 and 114 may be managed by the manufacturer server 160 via the internet 150. The manufacturer server 160 may store the node configuration information 121, and may select the node configuration information based on the one or more identifiers associated with the computing nodes 112 and 114.

In operation, the computing node cluster 110 may be in physically remote location from the configuration management system 120. Conventional installation of the computing node cluster 110 may be difficult and/or expensive, as options may include hiring personnel to be physically present to manage the computing node cluster 110, or sending existing personnel to the computing node cluster 110 to manage the computing node cluster 110. To mitigate the conventional expense, the computing nodes 112 and 114 running the initialization applications/services 113 and 115, respectively, may contact and communicate with the configuration management system 120 to facilitate transfer of the node configuration information 121, which may include authentication information (e.g., encryption keys), selected software images, support contracts, licenses, assigned policies, update procedures, marketing information, etc., to each of the computing node 112 and the computing node 114 for installation. In some examples, if the computing nodes 112 or 114 are not loaded with images for the initialization application/services 113 or 115, the computing nodes 112 or 114 may load the images to load and boot the initialization application/services 113 or 115 from the external media 170.

Initially, to connect to the network 140, the initialization applications/services 113 and 115 may cause the computing nodes 112 and 114, respectively, to broadcast a discovery message to request for network resources. The broadcast discovery message may include an identifier specific to the computing node 112 or 114. The broadcast discovery message may be transmitted using DHCP.

In response to the broadcast discovery message, the network configuration manager 130 may select network resources to offer to the computing node 112 or 114 and may provide an offer message to the computing node 112 or 114 that includes the selected network resources (e.g., an offered IP address, server, gateway, and client IP addresses, lease time, DHCP server IP address, etc.).

In response to the offer message, the computing node 112 or 114 may provide a request message to the network management server 130 to request network resources. The requested network resources may be the offered network resources from the offer message, or may different network resources. The network management server 130 may respond with an acknowledgment message that includes an assigned IP address, server, gateway, and client IP addresses, lease time, DHCP server IP address, etc.

In some examples, the computing nodes 112 and/or 114 may provide a vendor class identifier in one or both of the discovery message and the request message. In response to the vendor class identifier, the network management server 130 may look up additional vendor-specific information to be provided the computing node 112 or 114 based on the vendor class identifier. The vendor-specific information may include contact information associated with the configuration management system 120, including an address, an authentication key (e.g., API encryption key), or combinations thereof. The network management server 130 may further include the contact information associated with the configuration management system 120, such as an address and an authentication key (e.g., API encryption key) in one or both of the offer message or the acknowledgment message. The contact information associated with the configuration management system 120 may be encoded in vendor encapsulated options of the offer and/or the acknowledgement message such that it can be decoded by the initialization applications/services 113 and/or 115, in some examples.

In some examples, the network management server 130 may include the contact information associated with the configuration management system 120 in one or more custom options of the offer and/or acknowledgment message, in addition to or in lieu of inclusion in the vendor encapsulated options.

Using the contact information, the computing node 112 or 114 may send a registration request message to the configuration management system 120. The message may include an API call, in some examples. The API call may be encrypted using an API encryption key provided by the network management server 130. The registration request message may include identifying information specific to the computing node 112 or 114.

In response to receipt of a registration request from the computing node 112 or 114, the configuration management system 120 may identify a node pool from the node configuration information 121 with qualification parameters that match the identifying information received in the registration request, such as a physical location, a model number, a serial number, another identifier, etc. If the configuration management system 120 fails to identify a node pool that has qualification parameters that match the identifying information, the configuration management server 120 may send a NACK message to the computing node 112 or 114.

If a node pool is identified, the configuration management system 120 may send an ACK message and may look up the bound configuration image template to select configuration information for the computing node using the identified node pool, including software versions, hypervisor version/type, instructions regarding cluster formation (e.g., including a number of nodes in the cluster). The configuration management system 120 may also access the resource pools linked to the image configuration template to select various configuration parameters, such as one or more IP addresses (e.g., such as an IPMI IP address, a CVM IP address, a Hypervisor IP address, or combinations thereof). The image configuration template may also provide additional information, such as other software versions and images, policies, licenses, support contracts, update procedures, or any combination thereof.

The configuration management system 120 may transfer selected node configuration information selected based on the image configuration template and from the resource pools of the node configuration information 121 to one or more of the computing nodes 112 and 114 via the network 140. In some examples where bandwidth in limited via the network 140, such as over a wide area network, the configuration management system 120 may designate one of the computing nodes 112 or 114 as a primary computing node, and may transfer the node configuration information 121 to the primary computing node. The primary computing node may manage transfer of the node configuration information 121 over a local area network to the other computing node 112 or 114. After the computing nodes 112 or 114 are loaded with the node configuration information, the computing nodes 112 or 114 may be brought online and into service. In another example where bandwidth is limited over the network 140, the configuration management system 120 may direct the computing node 112 (or 114) to retrieve the node configuration information from an external media source 170, such as a portable flash drive connected via a universal serial bus (USB) port.

Figure 2:
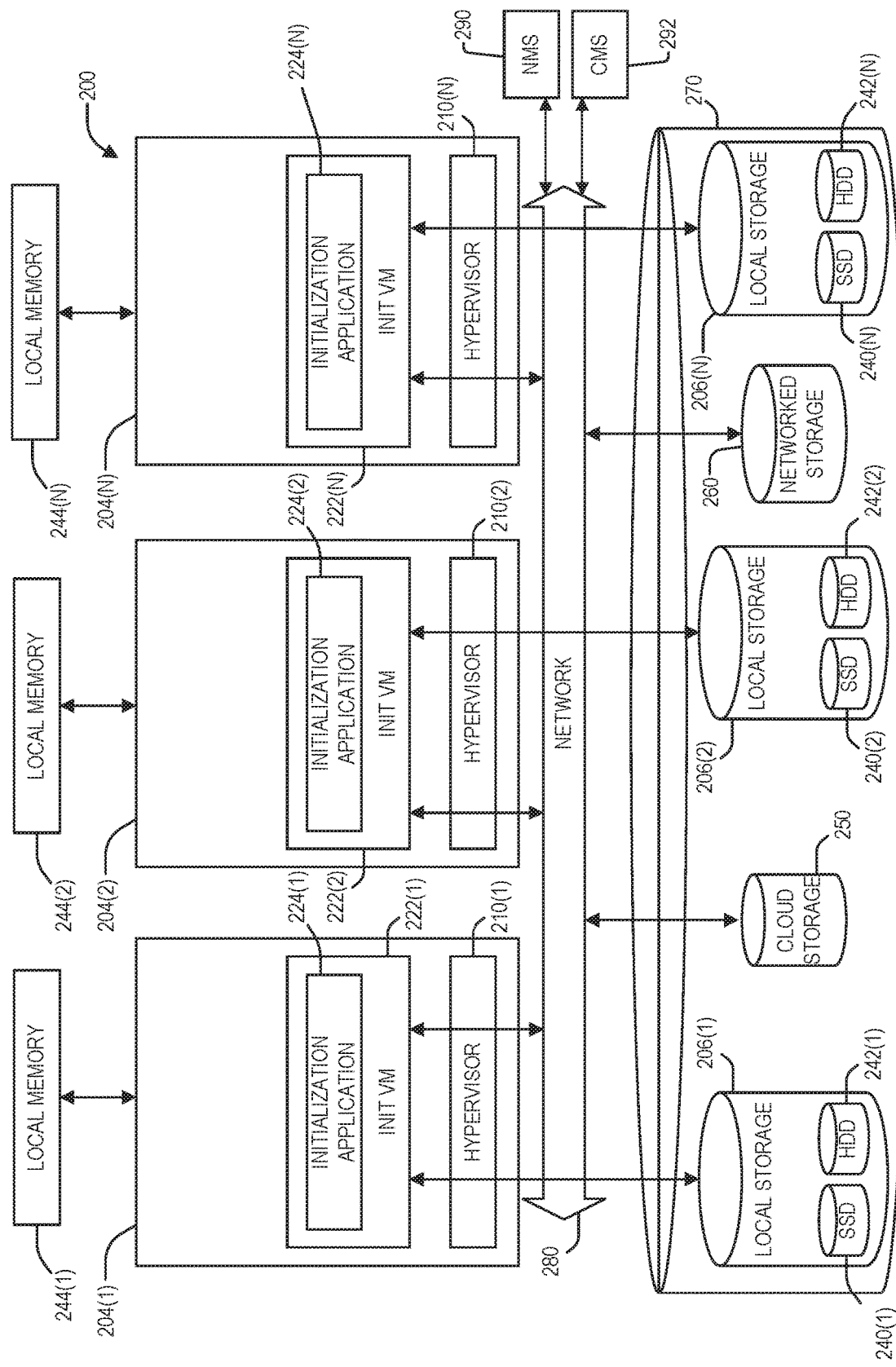
FIG. 2 is a block diagram of a distributed computing system 200 prior to initialization, in accordance with an embodiment of the present disclosure.

FIG. 2 is a block diagram of a distributed computing system 200 prior to initialization, in accordance with an embodiment of the present disclosure. The distributed computing system of FIG. 2 generally includes computing nodes 204(1)-(N) and storage 270 connected to a network 280. While FIG. 2 depicts three computing nodes, the distributed computing system 200 may include two or more than three computing nodes without departing from the scope of the disclosure. The network 280 may be any type of network capable of routing data transmissions from one network device (e.g., computing nodes 204(1)-(N) and storage 270) to another. For example, the network 280 may be a local area network (LAN), wide area network (WAN), intranet, Internet, or a combination thereof. The network 280 may be a wired network, a wireless network, or a combination thereof.

The storage 270 may include local storage 206(1)-(N), cloud storage 250, and networked storage 260. The local storage 206(1)-(N) may include, for example, one or more solid state drives (SSDs 240(1)-(N)) and one or more hard disk drives (HDD 242(1)-(N)). The local storage 206(1)-(N) may be directly coupled to, included in, and/or accessible by a respective computing nodes 204(1)-(N) without communicating via the network 280. The cloud storage 250 may include one or more storage servers that may be stored remotely to the computing nodes 204(1)-(N) and accessed via the network 280. The cloud storage 250 may generally include any type of storage device, such as HDDs SSDs, or optical drives. The networked storage 260 may include one or more storage devices coupled to and accessed via the network 280. The networked storage 260 may generally include any type of storage device, such as HDDs SSDs, or optical drives. In various embodiments, the networked storage 260 may be a storage area network (SAN). The computing node 202 is a computing device for hosting VMs in the distributed computing system 200 of FIG. 2. The computing node 202 may be, for example, a server computer, a laptop computer, a desktop computer, a tablet computer, a smart phone, or any other type of computing device. The computing node 202 may include one or more physical computing components, such as processors.

Each of the computing nodes 204(1)-(N) may include a computing device configured to host a respective hypervisor 210(1)-(N) and an 222(1)-(N) that executes a respective initialization service/application 224(1)-(N). In some examples, the 222(1)-(N) may execute on the physical computing node without the respective hypervisor 210(1)-(N). For example, each of the computing nodes 204(1)-(N) may be or include a server computer, a laptop computer, a desktop computer, a tablet computer, a smart phone, any other type of computing device, or any combination thereof. Each of the computing nodes 204(1)-(N) may include one or more physical computing components, such as one or more processor units, respective local memory 244(1)-(N) (e.g., cache memory, dynamic random-access memory (DRAM), non-volatile memory (e.g., flash memory, etc.), portable memory connected via I/O ports, or combinations thereof), the respective local storage 206(1)-(N), ports (not shown) to connect to peripheral input/output (I/O) devices (e.g., touchscreens, displays, speakers, keyboards, mice, cameras, microphones, environmental sensors, etc.).

Each of the hypervisors 210(1)-(N) may include any type of hypervisor. For example, each of the hypervisors 210(1)-(N) may include an ESX, an ESX(i), a Hyper-V, a KVM, or any other type of hypervisor. Each of the hypervisors 210(1)-(N) may manage the allocation of physical resources (e.g., physical processor units, volatile memory, the storage 270) to respective hosted components (e.g., 222(1)-(N)) and performs various VM and/or container related operations, such as creating new VMs and/or containers, cloning existing VMs and/or containers, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 210(1)-(N) may all include a common hypervisor type, may all include different hypervisor types, or may include any combination of common and different hypervisor types.

During operation, the computing nodes 204(1)-(N) may be initially loaded with the 222(1)-(N) that each executes the respective initialization service/application 224(1)-(N). On an initial power up, each respective the respective initialization service/application 224(1)-(N) may be configured to facilitate connection to the network 280 and to initiate registration and authentication with a configuration management system 292 to receive node configuration information for the installed application or implementation. For example, the computing nodes 204(1)-(N) may receive and load node configuration information that sets up the computing nodes 204(1)-(N) as nodes of a cluster for a distributed file system or a backup file system or a disaster recovery system.

Contact information for the configuration management system 292 may be handled via communication with a network management server 290 to connect to the network 180. For example, the initialization applications/services 224(1)-(N) may contact the network management server 290 to negotiate network resources associated with the network 280, as well as receive the contact information associated with the configuration management system 292 via specific fields of one or more of the DBCP messages (e.g., the offer and/or acknowledgement messages). Initially, each initialization applications/service 224(1)-(N) may broadcast a discovery message to negotiate access to network resources of the network 280 with the network management server 290. The discovery message may include an identifier associated with the respective computing node 204(1)-(N). The network management server 290 may respond with an offer message that includes offered network resources (e.g., an IP address, server, gateway, and client IP addresses, lease time, DHCP server IP address, etc.).

In response to the offer message, each initialization applications/service 224(1)-(N) may provide a request message to the network management server 290 to request network resources. The requested network resources may be the offered network resources from the offer message, or may different network resources. The network management server 290 may respond with an acknowledgment message that includes an assigned address, server, gateway, and client IP addresses, lease time, DHCP server IP address, etc.

In some examples, each initialization applications/service 224(1)-(N) may provide a vendor class identifier in one or both of the discovery message and the request message. In response to the vendor class identifier, the network management server 290 may look up additional vendor-specific information to be provided the respective computing node 204(1)-(N) based on the vendor class identifier. The vendor-specific information may include contact information associated with the configuration management system 292, including an address, an authentication key (e.g., API encryption key), or combinations thereof. The network management server 290 may further include the contact information associated with the configuration management system 292, such as an address and an authentication key (e.g., API encryption key) in one or both of the offer message or the acknowledgment message. The contact information associated with the configuration management system 292 may be encoded in vendor encapsulated options of the offer and/or the acknowledgement message such that it can be decoded by the initialization applications/services 224(1)-(N), in some examples.

In some examples, the network management server 290 may include the contact information associated with the configuration management system 292 in one or more custom options of the offer and/or acknowledgment message, in addition to or in lieu of inclusion in the vendor encapsulated options.

Using the contact information, each initialization applications/service 224(1)-(N) may send a registration request message to the configuration management system 292. The configuration management system 292 may include one or more computing devices or servers, each including one or more processors and memory, etc. that are configured to store software or instructions that, when executed, cause the configuration management system 292 to perform operations described herein. The message may include an API call, in some examples. The API call may be encrypted using an API encryption key provided by the network management server 290. The registration request message may include identifying information specific to each of the computing nodes 204(1)-(N).

In response to receipt of a registration request, the configuration management system 292 may identify a node pool with qualification parameters that match the identifying information received in the registration request, such as a physical location, a model number, a serial number, another identifier, etc. If the configuration management system 292 fails to identify a node pool that has qualification parameters that match the identifying information, the configuration management system 292 may send a NACK message to the requesting computing node 204(1)-(N).

If a node pool is identified, the configuration management system 292 may send an ACK message and may look up the bound configuration image template to select configuration information for the computing node using the identified node pool, including software versions, hypervisor version/type, instructions regarding cluster formation (e.g., including a number of nodes in the cluster). The configuration management system 292 may also access the resource pools linked to the image configuration template to select various configuration parameters, such as one or more IP addresses (e.g., such as an IPMI IP address, a CVM IP address, a Hypervisor IP address, or combinations thereof). The image configuration template may also provide additional information, such as other software versions and images, policies, licenses, support contracts, update procedures, or any combination thereof.

The configuration management system 292 may transfer the node configuration information to one or more of the computing nodes 204(1)-(N) via the network 280. In some examples where bandwidth in limited via the network 280, such as over a wide area network, the configuration management system 292 may designate one of the computing nodes 204(1)-(N) as a primary computing node, and may transfer the node configuration information to the primary computing node. The primary computing node may manage transfer of the node configuration information over a local area network to other computing nodes 204(1)-(N).

In another example where bandwidth is limited over the network 280, the configuration management system 292 may direct the computing nodes 204(1)-(N) to retrieve the node configuration information from the local memory 244(1)-(N), which may include fixed memory or a portable flash drive connected via an I/O port (e.g., a universal serial bus (USB) port or some other I/O port).

Figure 3:
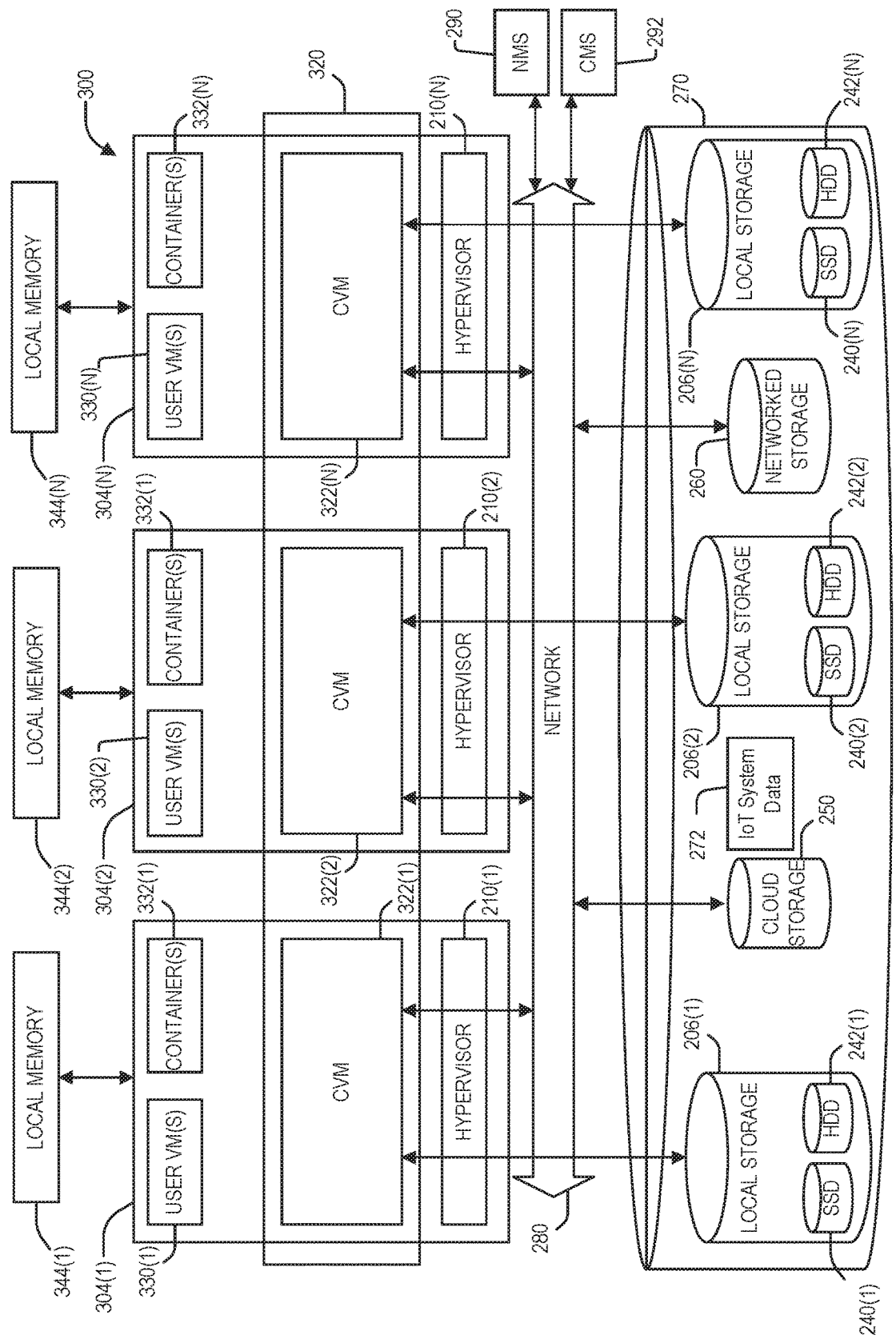
FIG. 3 is a block diagram of a distributed computing system at an intermediate step of initialization during a serial installation, in accordance with an embodiment of the present disclosure.

After the computing nodes 204(1)-(N) are loaded with the node configuration information, the computing nodes 204(1)-(N) may be brought online and into service. FIG. 3 is a block diagram of a distributed computing system 300 after initialization, in accordance with an embodiment of the present disclosure. The distributed computing system 300 may include elements that have been previously described with respect to the distributed computing system 200 of FIG. 3. Those elements have been identified in FIG. 3 using the same reference numbers used in FIG. 2 and operation of the common elements is as previously described. Consequently, a detailed description of the operation of these particular elements will not be repeated in the interest of brevity.

In addition to hosting the respective hypervisor 210(1)-(N), each of the computing nodes 204(1)-(N) may be further configured to host a respective controller virtual machine (CVM) 322(1)-(N), respective user (or guest) virtual machines (VMs) 330(1)-(N), and respective containers 332(1)-(N).

Each of the user VMs 330(1)-(N) hosted on the respective computing node includes at least one application and everything the user VM needs to execute (e.g., run) the at least one application (e.g., system binaries, libraries, etc.). Each of the user VMs 330(1)-(N) may generally be configured to execute any type and/or number of applications, such as those requested, specified, or desired by a user. Each of the user VMs 330(1)-(N) further includes a respective virtualized hardware stack (e.g., virtualized network adaptors, virtual local storage, virtual memory, processor units, etc.). To manage the respective virtualized hardware stack, each of the user VMs 330(1)-(N) is further configured to host a respective operating system (e.g., Windows®, Linux®, etc.). The respective virtualized hardware stack configured for each of the user VMs 330(1)-(N) may be defined based on available physical resources (e.g., processor units, the local memory 244(1)-(N), the local storage 206(1)-(N), etc.). That is, physical resources associated with a computing node may be divided between (e.g., shared among) components hosted on the computing node (e.g., the hypervisor 210(1)-(N), the CVM 322(1)-(N), other user VMs 330(1)-(N), the containers 332(1)-(N), etc.), and the respective virtualized hardware stack configured for each of the user VMs 330(1)-(N) may reflect the physical resources being allocated to the user VM. Thus, the user VMs 330(1)-(N) may isolate an execution environment my packaging both the user space (e.g., application(s), system binaries and libraries, etc.) and the kernel and/or hardware (e.g., managed by an operating system). While FIG. 3 depicts the computing nodes 204(1)-(N) each having multiple user VMs 330(1)-

(N), a given computing node may host no user VMs or may host any number of user VMs.

Rather than providing hardware virtualization like the user VMs 330(1)-(N), the respective containers 332(1)-(N) may each provide operating system level virtualization. Thus, each of the respective containers 332(1)-(N) is configured to isolate the user space execution environment (e.g., at least one application and everything the container needs to execute (e.g., run) the at least one application (e.g., system binaries, libraries, etc.)) without requiring an operating system to manage hardware. Individual ones of the containers 332(1)-(N) may generally be provided to execute any type and/or number of applications, such as those requested, specified, or desired by a user. Two or more of the respective containers 332(1)-(N) may run on a shared operating system, such as an operating system of any of the hypervisor 210(1)-(N), the CVM 322(1)-(N), or other user VMs 330 (1)-(N). In some examples, an interface engine may be installed to communicate between a container and an underlying operating system. While FIG. 3 depicts the computing nodes 204(1)-(N) each having multiple containers 332(1)-(N), a given computing node may host no containers or may host any number of containers.

As previously described, each of the hypervisors 210(1)-(N) may manage the allocation of physical resources (e.g., physical processor units, volatile memory, the storage 270) to respective hosted components (e.g., CVMs 322(1)-(N), respective user VMs 330(1)-(N), respective containers 332 (1)-(N)) and performs various VM and/or container related operations, such as creating new VMs and/or containers, cloning existing VMs and/or containers, etc.

The CVMs 322(1)-(N) may provide services for the respective hypervisors 210(1)-(N), the respective user VMs 330(1)-(N), and/or the respective containers 332(1)-(N) hosted on a respective computing node of the computing nodes 204(1)-(N). For example, each of the CVMs 322(1)-(N) may execute a variety of software and/or may serve the I/O operations for the respective hypervisor 210(1)-(N), the respective user VMs 330(1)-(N), and/or the respective containers 332(1)-(N) hosted on the respective computing node 204(1)-(N). The CVMs 322(1)-(N) may communicate with one another via the network 280. By linking the CVMs 322(1)-(N) together via the network 280, a distributed network (e.g., cluster, system, etc.) of the computing nodes 204(1)-(N) may be formed. In an example, the CVMs 322(1)-(N) linked together via the network 280 may form a distributed computing environment (e.g., a distributed virtualized file server) 220 configured to manage and virtualize the storage 270. In some examples, a SCSI controller, which may manage the SSD devices 240(1)-(N) and/or the HDD devices 242(1)-(N) described herein, may be directly passed to the respective CVMs 322(1)-(N), such as by leveraging a VM-Direct Path. In the case of Hyper-V, the SSD devices 240(1)-(N) and/or the HDD devices 242(1)-(N) may be passed through to the respective CVMs 322(1)-(N).

The CVMs 322(1)-(N) may coordinate execution of respective services over the network 280, and the services running on the CVMs 322(1)-(N) may utilize the local memory 244(1)-(N) to support operations. The local memory 244(1)-(N) may be shared by components hosted on the respective computing node 204(1)-(N), and use of the respective local memory 244(1)-(N) may be controlled by the respective hypervisor 210(1)-(N). Moreover, multiple instances of the same service may be running throughout the distributed system 300. That is, the same services stack may be operating on more than one of the CVMs 322(1)-(N). For example, a first instance of a service may be running on the CVM 222(1), a second instance of the service may be running on the CVM 222(2), etc.

Figure 4:
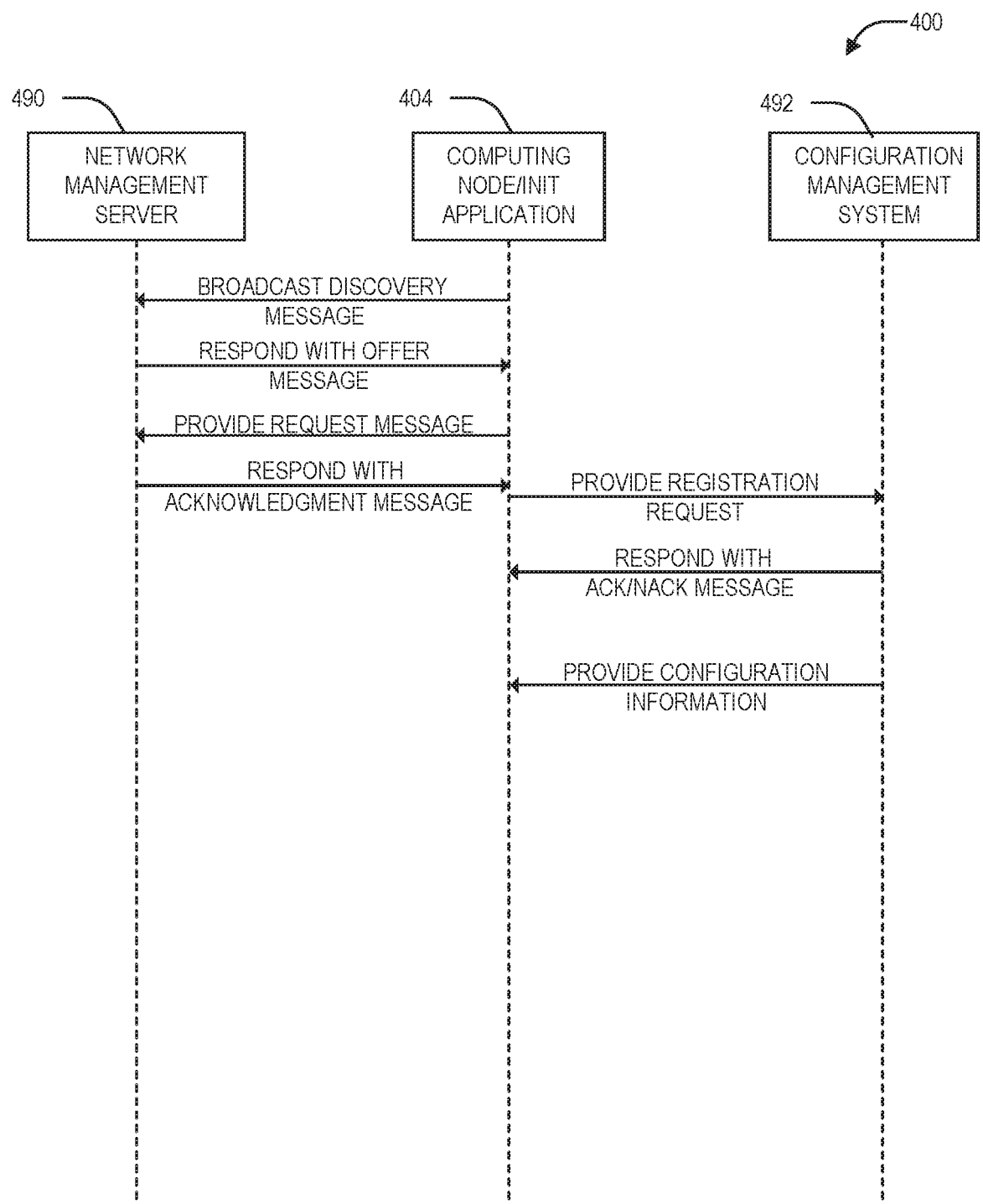
FIG. 4 is a sequence diagram to register and authenticate a deployed computing node, in accordance with an embodiment of the present disclosure.

FIG. 4 is a sequence diagram 400 to register and authenticate a deployed computing node, in accordance with an embodiment of the present disclosure. The sequence diagram of FIG. 4 may be performed via the system 100 of FIG. 1, the system 200 of FIG. 2, and/or the system 300 of FIG. 3. The sequence diagram may include a network management server 490, a computing node/initialization application 404, and a configuration management system 492. The network management server 130 of FIG. 1 and/or the network management server 290 of FIGS. 2 and 3 may implement the network management server 490. Either of the computing nodes 112 and 114 of FIG. 1 and/or any of the computing nodes 204(1)-(N) of FIGS. 2 and 3 may implement the computing node/initialization application 404. The configuration management system 120 of FIG. 1 and/or the configuration management system 292 of FIGS. 2 and 3 may implement the network management server 490. In some examples, the messages transmitted between the computing node/initialization application 404 and the network management server 490 may follow DHCP.

Initially, to connect to a network, the computing node/initialization application 404 may broadcast a discovery message to request for network resources. The broadcast discovery message may include an identifier specific to the computing node/initialization application 404.

In response to the broadcast discovery message, the network management server 490 may select network resources to offer to the computing node/initialization application 404 and may provide an offer message to the computing node/initialization application 404 that includes the selected network resources (e.g., an offered IP address, server, gateway, and client IP addresses, lease time, DHCP server IP address, etc.).

In response to the offer message, the computing node/initialization application 404 may provide a request message to the network management server 490 to request network resources. The requested network resources may be the offered network resources from the offer message, or may different network resources. The network management server 490 may respond with an acknowledgment message that includes an assigned IP address, server, gateway, and client IP addresses, lease time, DHCP server IP address, etc.

In some examples, the computing node/initialization application 404 may provide a vendor class identifier in one or both of the discovery message and the request message. In response to the vendor class identifier, the network management server 490 may look up additional vendor-specific information to be provided the computing node/initialization application 404 based on the vendor class identifier. The vendor-specific information may include contact information associated with the configuration management system 492, including an address, an authentication key (e.g., API encryption key), or combinations thereof. The network management server 490 may further include the contact information associated with the configuration management system 492, such as an address and an authentication key (e.g., API encryption key) in one or both of the offer message or the acknowledgment message. The contact information associated with the configuration management system 492 may be encoded in vendor encapsulated options of the offer and/or the acknowledgement message such that it can be decoded by the computing node/initialization application 404, in some examples.

Using the contact information, the computing node/initialization application 404 may send a registration request message to the configuration management system 492. The message may include an API call, in some examples. The API call may be encrypted using an API encryption key provided by the network management server 490. The registration request message may include identifying information specific to the computing node/initialization application 404.

In response to receipt of a registration request, the configuration management system 492 may identify a node pool with qualification parameters that match the identifying information received in the registration request, such as a physical location, a model number, a serial number, another identifier, etc. If the configuration management system 492 fails to identify a node pool that has qualification parameters that match the identifying information, the configuration management system 292 may send a NACK message to the requesting computing node 404.

If a node pool is identified, the configuration management system 492 may send an ACK message and may look up the bound configuration image template to select configuration information for the computing node using the identified node pool, including software versions, hypervisor version/type, instructions regarding cluster formation (e.g., including a number of nodes in the cluster). The configuration management system 492 may also access the resource pools linked to the image configuration template to select various configuration parameters, such as one or more IP addresses (e.g., such as an IPMI IP address, a CVM IP address, a Hypervisor IP address, or combinations thereof). The image configuration template may also provide additional information, such as other software versions and images, policies, licenses, support contracts, update procedures, or any combination thereof.

The configuration management system 492 may transfer the selected node configuration information to the computing node/initialization application 404.

Figure 5:
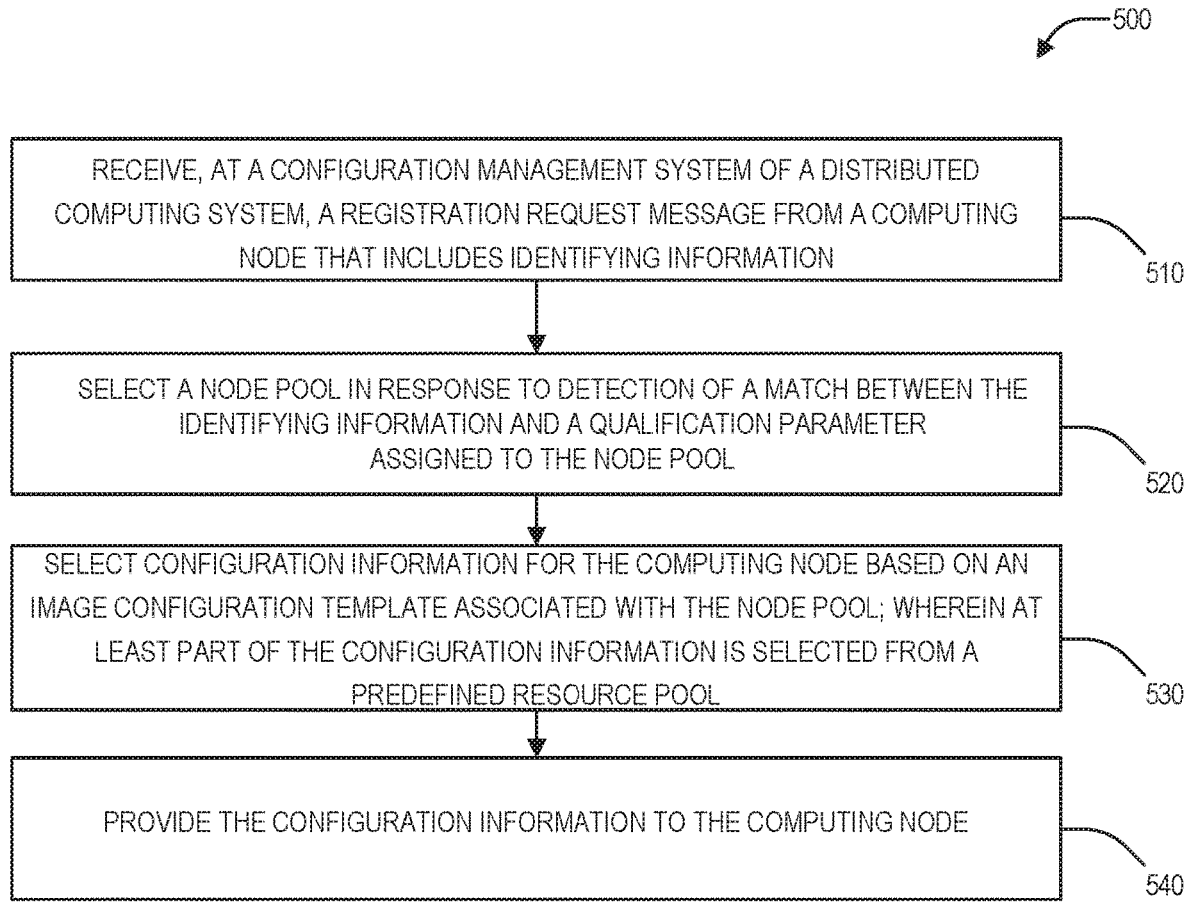
FIG. 5 is a flow diagram illustrating a method for initializing computing nodes of a computing node cluster in accordance with an embodiment of the present disclosure.

FIG. 5 is a flow diagram illustrating a method 500 for initializing a computing node using configuration templates and resource pools in accordance with an embodiment of the present disclosure. The method 500 may be performed by the configuration management system 120 of FIG. 1, the configuration management system 292 of FIGS. 2 and 3, the configuration management system 492 FIG. 4, or any combination thereof.

The method 500 may include receiving, at a configuration management system of a distributed computing system, a registration request message from a computing node that includes identifying information, at 510. The computing node may include either of the computing nodes 112 and 114 of FIG. 1, any of the computing nodes 204(1)-(N) of FIGS. 2 and 3, and/or the computing node/initialization application 404 of FIG. 4. The identifying information may include a physical location, a model number, a serial number, another identifier, or combinations thereof.

The method 500 may further include selecting a node pool in response to detection of a match between the identifying information matching a qualification parameter assigned to the node pool, at 520. The node pool may be selected from the node configuration information 121 of FIG. 1. In some examples, the method 500 may further include comparing the identifying information to the qualification parameter assigned to one or more of a plurality of node pools, including the node pool, to detect a match. In some examples, the method 500 may further include sending an acknowledgment message to the computing node in response to detection of a match between second identifying information received from a second computing node matching a second qualification parameter assigned to the second node pool. In some examples, the method 500 may further include sending a non-acknowledgment message to the computing node in response to failure to detect a match between the identifying information and a qualification parameter assigned to any node pool.

The method 500 may further include selecting configuration information for the computing node based on an image configuration template associated with the node pool, at 530. At least part of the configuration information is selected from a predefined resource pool. The image configuration template and the resource pools may be included in the node configuration information 121 of FIG. 1. In some examples, the predefined resource pool includes an intelligent platform management interface (IPMI) IP address pool, a controller virtual machine (CVM) IP address pool, a Hypervisor IP address pool, or combinations thereof. In some examples, the configuration information includes authentication information, software images, firmware, network configuration settings, policies, licenses, support contracts, update procedures, any combination thereof. In some examples, the resource pools include one or more internet protocol address pools.

The method 500 may further include providing the configuration information to the computing node, at 540. In some examples, the method 500 may further include selecting, at the configuration management server, second configuration information for provision to the second computing node based on a second image configuration template associated with a selected second node pool, wherein at least part of the second configuration information is selected from a second predefined resource pool. In some examples, the method 500 may further include selecting, at the configuration management server, the second node pool in response to detection of a match between second identifying information received from a second computing node matching a second qualification parameter assigned to the second node pool.

Figure 6:
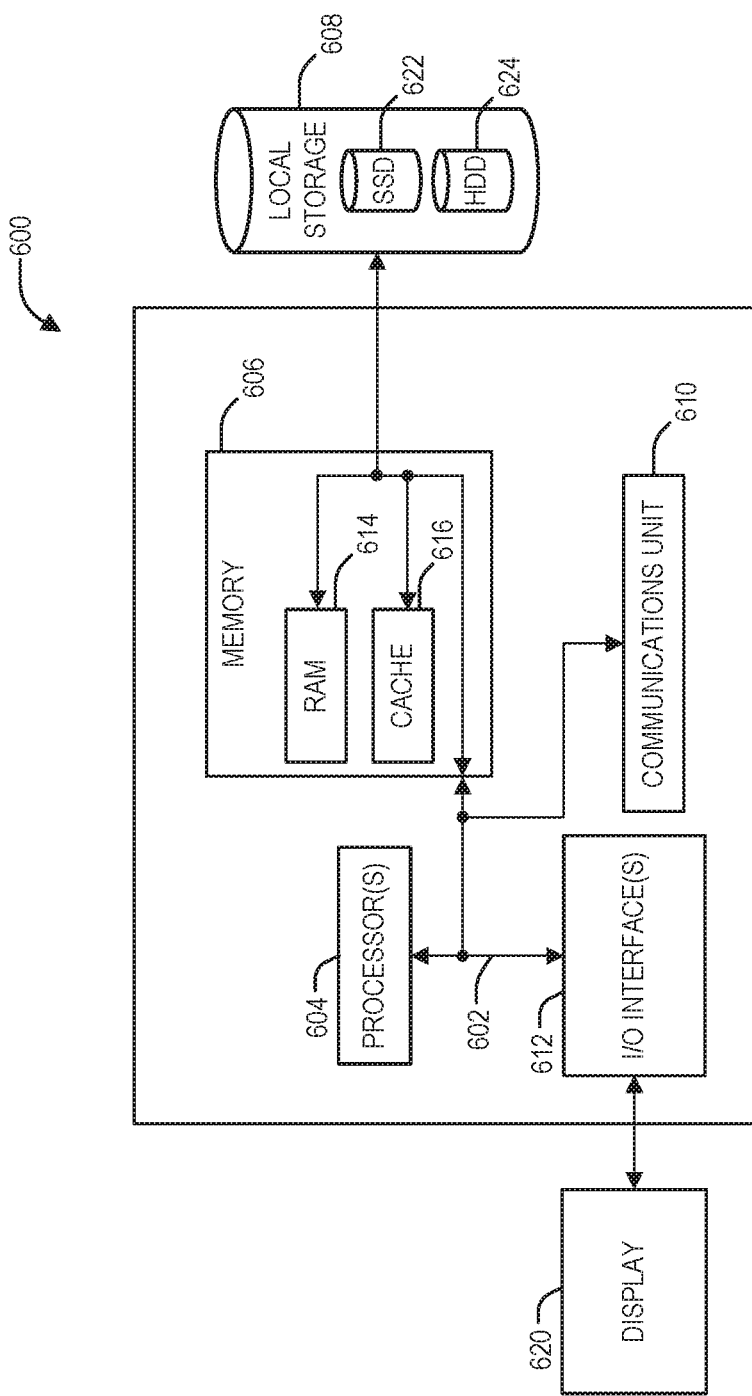
FIG. 6 depicts a block diagram of components of a computing node in accordance with an embodiment of the present disclosure.

FIG. 6 depicts a block diagram of components of a computing node 600 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made. The computing node 600 may implemented as either of the computing nodes 112 or 114 or the configuration management system 120 of FIG. 1, any of the computing nodes 204(1)-(N) or the configuration management system 292 of FIGS. 2 and 3, and/or the computing node/initialization application 404 or the configuration management system 492 of FIG. 4. The computing node 600 may be configured to implement the method 500 of FIG. 5 select configuration information based on a configuration image, node pools, and resource pools for provision to a computing node for initialization.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 206(1)-(N) of FIGS. 2 and 3. In this embodiment, the local storage 608 includes an SSD 622 and an HDD 624, which may be implemented as described above with respect to SSDs 240(1)-(N) and HDDs 242(1)-(N), respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

What is claimed is:

1. At least one non-transitory computer-readable storage medium including instructions that when executed by a configuration management system, cause the configuration management system to:
   receive a registration request message from a computing node, wherein the registration request includes identifying information associated with the computing node;
   select a node pool in response to detection of a match between the identifying information matching a qualification parameter at least partially defining the node pool;
   access an image configuration template, the image configuration template including instructions for selecting configuration information for the node pool, wherein the node pool includes a plurality of nodes having the qualification parameter;
   select configuration information for the computing node based on the image configuration template, wherein at least part of the configuration information is selected from a predefined resource pool referenced in the image configuration template; and
   provide the configuration information to the computing node.

2. The at least one computer-readable storage medium of claim 1, wherein the configuration information includes a software version for installation on the computing node, a hypervisor type, an instruction for cluster formation by the computing node, or any combination thereof.

3. The at least one computer-readable storage medium of claim 1, wherein the predefined resource pool includes a hypervisor internet protocol address pool.

4. The at least one computer-readable storage medium of claim 1, wherein the instructions, when executed, further cause the configuration management system to compare the identifying information to the qualification parameter assigned to one or more of a plurality of node pools, including the node pool, to detect a match.

5. The at least one computer-readable storage medium of claim 1, wherein the instructions, when executed, further cause the configuration management system to select second configuration information for provision to a second computing node based on a second image configuration template associated with a selected second node pool, wherein at least part of the second configuration information is selected from a second predefined resource pool.

6. The at least one computer-readable storage medium of claim 5, wherein the instructions, when executed, further cause the configuration management system to select the second node pool in response to detection of a match between second identifying information received from the second computing node matching a second qualification parameter assigned to the second node pool.

7. The at least one computer-readable storage medium of claim 5, wherein the instructions, when executed, further cause the configuration management system to provide the second configuration information to the computing node, wherein the computing node is in communication with the second computing node.

8. The at least one computer-readable storage medium of claim 1, wherein the qualification parameter includes one or more of a physical location, a model number, or a serial number of the computing node.

9. The at least one computer-readable storage medium of claim 1, wherein the instructions, when executed, further cause the configuration management system to send a non-acknowledgment message to the computing node in response to failure to detect a match between the identifying information and a qualification parameter assigned to any node pool.

10. The at least one computer-readable storage medium of claim 1, wherein the registration request message is encrypted using an application programming interface encryption key.

11. The at least one computer-readable storage medium of claim 1, wherein the instructions, when executed, further cause the configuration management system to generate, based on the image configuration template and the configuration information, a software image for the computing node.

12. The at least one computer-readable storage medium of claim 11, wherein the configuration information is provided to the computing node with the software image for the computing node.

13. The at least one computer-readable storage medium of claim 1, wherein the registration request is received from an initialization application executing on the computing node, wherein the initialization application is configured to image the computing node using the configuration information provided to the computing node by the configuration management system.

14. A configuration management system, wherein the configuration management system is installed with software configured to cause the configuration management system to perform operations comprising:
receiving a registration request message from a computing node, wherein the registration request includes identifying information associated with the computing node;
selecting a node pool in response to detection of a match between the identifying information matching a qualification parameter at least partially defining to the node pool;
accessing an image configuration template, the image configuration template including instructions for selecting configuration information for the node pool, wherein the node pool includes a plurality of nodes having the qualification parameter;
selecting configuration information for the computing node based on the image configuration template, wherein at least part of the configuration information is selected from a predefined resource pool referenced in the image configuration template; and
providing the configuration information to the computing node.

15. The configuration management system of claim 14, wherein the software is further configured to cause the configuration management system to perform operations comprising comparing the identifying information to the qualification parameter assigned to one or more of a plurality of node pools, including the node pool, to detect a match.

16. The configuration management system of claim 14, wherein the software is further configured to cause the configuration management system to perform operations comprising selecting second configuration information for provision to a second computing node based on a second image configuration template associated with a selected second node pool, wherein at least part of the second configuration information is selected from a second predefined resource pool.

17. The configuration management system of claim 16, wherein the software is further configured to cause the configuration management system to perform operations comprising selecting the second node pool in response to detection of a match between second identifying information received from the second computing node matching a second qualification parameter assigned to the second node pool.

18. The configuration management system of claim 16, wherein the software is further configured to cause the configuration management system to perform operations comprising providing the second configuration information to the computing node, wherein the computing node is in communication with the second computing node.

19. The configuration management system of claim 14, wherein the qualification parameter includes one or more of a physical location, a model number, or a serial number of the computing node.

20. The configuration management system of claim 14, wherein the software is further configured to cause the configuration management system to perform operations comprising generating, based on the image configuration template and the configuration information, a software image for the computing node.

21. The configuration management system of claim 20, wherein the configuration information is provided to the computing node with the software image for the computing node.

22. The configuration management system of claim 14, wherein the registration request is received from an initialization application executing on the computing node, wherein the initialization application is configured to image the computing node using the configuration information provided to the computing node by the configuration management system.

23. A method comprising:
receiving, at a configuration management system of a distributed computing system, a registration request message from a computing node, wherein the registration request includes identifying information associated with the computing node;
selecting a node pool in response to detection of a match between the identifying information matching a qualification parameter at least partially defining the node pool;
accessing an image configuration template, the image configuration template including instructions for selecting configuration information for the node pool, wherein the node pool includes a plurality of nodes having the qualification parameter;
selecting configuration information for the computing node based on the image configuration template, wherein at least part of the configuration information is selected from a predefined resource pool referenced in the image configuration template; and
providing the configuration information to the computing node.

24. The method of claim 23, further comprising selecting, at the configuration management server, second configuration information for provision to a second computing node based on a second image configuration template associated with a selected second node pool, wherein at least part of the second configuration information is selected from a second predefined resource pool.

25. The method of claim 24, further comprising selecting, at the configuration management server, the second node pool in response to detection of a match between second identifying information received from the second computing node matching a second qualification parameter assigned to the second node pool.

26. The method of claim 24, further comprising providing the second configuration information to the computing node, wherein the computing node is in communication with the second computing node.

27. The method of claim 23, wherein the predefined resource pool includes an Intelligent Platform Management Interface (IPMI) IP address pool, a Controller Virtual Machine (CVM) IP address pool, a Hypervisor IP address pool, or combinations thereof.

28. The method of claim 23, further comprising sending a non-acknowledgment message to the computing node in response to failure to detect a match between the identifying information and a qualification parameter assigned to any node pool.

29. The method of claim 23, further comprising sending an acknowledgment message to the computing node in response to detection of the match between the identifying information matching the qualification parameter assigned to the node pool.

30. The method of claim 23, further comprising generating, based on the image configuration template and the configuration information, a software image for the computing node.

31. The method of claim 30, wherein the configuration information is provided to the computing node with the software image for the computing node.

32. The method of claim 23, wherein the registration request is received from an initialization application executing on the computing node, wherein the initialization application is configured to image the computing node using the configuration information provided to the computing node by the configuration management system.

* * * * *